(No Model.)
F. BENNETT.
APPLIANCE FOR HOLDING ARTICLES IN POSITION FOR CARVING MEAT, &c.
No. 361,742. Patented Apr. 26, 1887.
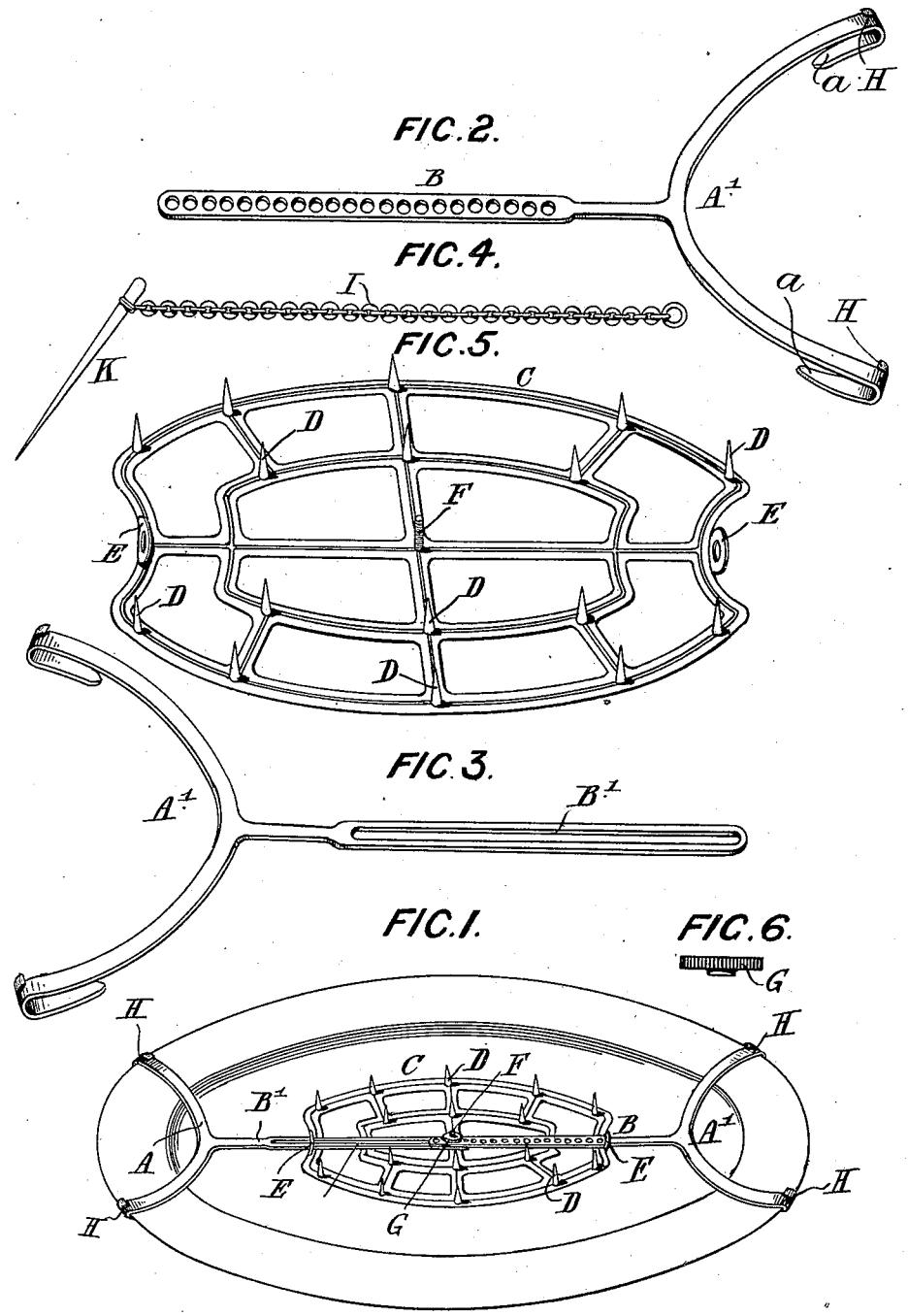

UNITED STATES PATENT OFFICE.

FREDERICK BENNETT, OF LONDON, ASSIGNOR TO FLORENCE LOUISE BENNETT, OF GLENWOOD, ENGLAND.

APPLIANCE FOR HOLDING ARTICLES IN POSITION FOR CARVING MEAT, &c.

SPECIFICATION forming part of Letters Patent No. 361,742, dated April 26, 1887.

Application filed December 13, 1886. Serial No. 221,393. (No model.) Patented in England May 20, 1886, No. 6,791.

*To all whom it may concern:*

Be it known that I, FREDERICK BENNETT, glass and china manufacturer, a subject of the Queen of Great Britain and Ireland, and residing at 50 Ludgate Hill, in the city of London, England, have invented a certain new and useful Appliance for Holding Articles in Position, intended more particularly for use in carving or cutting meat and other articles of food, (for which I have applied for a patent in Great Britain, No. 6,791, on May 20, 1886,) of which the following is a specification.

My invention has for its principal object to provide a cheap, simple, and efficient apparatus that can be easily applied and adjusted to a dish, plate, or other article on which a joint of meat or other article of food is to be placed, and which will hold the said joint or other article in position and prevent its slipping while it is being cut or carved; but it is also applicable for holding other articles in position while being operated on.

Apparatus constructed according to my invention consists of clips or clasps, which can be attached to the rims or borders of dishes or plates by simply slipping them over or on to the said rims or borders, in combination with a frame or stand provided with upwardly-projecting points, and made separate from the clips, but adjustably connected thereto in the manner hereinafter described.

The frame or stand may be of any suitable form and size, according to the article to be placed thereon.

In order that my said invention may be fully understood, I shall now proceed more particularly to describe the same with reference to the accompanying sheet of drawings, which illustrates an apparatus constructed according to my invention.

Figure 1 represents in plan a dish fitted with my apparatus for holding in position a joint of meat or other article of food. A A' are two clips or clasps, provided with hooks *a*, which engage the rim or edge of the dish at the opposite sides or ends thereof. These clips or clasps are each provided with an arm, B B', perforated with a number of holes, as shown in Fig. 2, or with a long slot or opening, as shown in Fig. 3.

C, Figs. 1 and 5, represents the frame or stand provided with points or prongs D, upon which the joint or other article of food is placed, and E are lugs or eyes through which the arms B B' are passed. F is a screwed stud projecting from the frame C, which stud enters one or other of the holes in the arm B, and passes through the slot or opening in the other arm, B B', the said arms being adjusted in position according to the size of the dish by sliding the one over the other, and they are securely held together in their adjusted position and to the frame C by a screw-nut, (shown detached in Fig. 6,) the apparatus being thus securely and firmly attached to the dish ready for use. On the clips or clasps A A' are hooks H, for the attachment of an arm or chain, I, (shown detached in Fig. 4,) carrying a skewer, K, which may be employed, if desired, for more securely holding the joint or other article in position on the frame.

The apparatus may be made of steel, malleable iron, brass, German silver, or other suitable metal or combination of metals, india-rubber, vulcanite, or other suitable material.

Having now particularly described and ascertained the nature of my said invention and in what manner the same is to be performed, I declare that what I claim is—

1. The combination of the frame or stand C and clips or clasps A A', having perforated or slotted arms B B', engaging a stud or studs on the frame or stand C, and secured thereto by a nut or nuts, the said clips being capable of adjustment nearer to or farther from each other to suit various-sized dishes or the like, substantially as hereinbefore described.

2. The frame or stand C, provided with stud F and guide-eyes E, in combination with the adjustable clips or clasps A A', having perforated or slotted arms B B', which pass through and are adapted to slide in the guide-eyes E, and engage and are detachably secured to the stud F, as and for the purposes hereinbefore set forth.

In testimony whereof I have signed my name to this specification in the presence of two subscribing witnesses.

FREDERICK BENNETT.

Witnesses:
 CHAS. JAS. JONES,
 HENRY NEWBY,
  *Both of 47 Lincoln's Inn Fields, London.*